United States Patent [19]

Nevins

[11] 4,286,582

[45] Sep. 1, 1981

[54] PREVENTION OF THERMAL BUILDUP BY CONTROLLED EXTERIOR MEANS AND SOLAR ENERGY COLLECTORS

[76] Inventor: Robert L. Nevins, High Point Mountain Rd., West Shokan, N.Y. 12494

[21] Appl. No.: 74,010

[22] Filed: Sep. 10, 1979

[51] Int. Cl.³ .............................................. F24J 3/02
[52] U.S. Cl. .................................. 126/446; 126/431
[58] Field of Search ............... 126/442, 446, 447, 431; 52/22, 20, 62; 220/62 X; 229/33

[56] References Cited

U.S. PATENT DOCUMENTS

| | | | |
|---|---|---|---|
| 2,480,706 | 8/1949 | Briwen | 126/446 |
| 3,199,760 | 8/1965 | Conescu | 229/33 |
| 4,011,856 | 3/1977 | Gallagher | 126/446 |
| 4,111,188 | 9/1978 | Murphy | 126/446 |
| 4,164,935 | 8/1979 | Marles | 126/447 |
| 4,197,834 | 4/1980 | Nevins | 126/442 |

FOREIGN PATENT DOCUMENTS 2359196  5/1975  Fed. Rep. of Germany .......... 126/431

Primary Examiner—Samuel Scott
Assistant Examiner—G. Anderson
Attorney, Agent, or Firm—Charles E. Baxley

[57] ABSTRACT

An illustrative embodiment of the invention discloses a solar energy system for a building. A plurality of interlocked thermally conductive flat solar energy collecting plates form a portion of the building's surface. Each of these plates has a web which is generally perpendicular to the web surface. This web supports a suitable tube which is received in notched rafters. The tube contains working fluid which absorbs thermal energy collected by the plates and transfers it to storage or to air flowing in a duct which is formed in the building or structure between a sheet which is attached to the opposite side of the rafters and the flat solar collecting plates which provide one surface of the building.

2 Claims, 5 Drawing Figures

PREVENTION OF THERMAL BUILDUP BY CONTROLLED EXTERIOR MEANS AND SOLAR ENERGY COLLECTORS

This invention relates to improvements in heating systems for buildings and more particularly, to an improved solar energy collection apparatus and method for use in connection with farm and residential buildings, and the like.

CROSS REFERENCES TO OTHER PATENT APPLICATIONS

U.S. patent application Ser. No. 896,470 filed Apr. 14, 1978 and U.S. Patent Application Ser. No. 953,156 filed Oct. 28, 1978.

There is a need for substantial improvement in building heating techniques. This need has become even more important in recent years not only because of the increased cost of fuels for residential and commercial heating and air conditioning systems, but also because of the general need to conserve all sources of energy.

Illustratively, U.S. Pat. No. 705,350 granted to P. G. Hubert on July 22, 1909 for "Solar Heater" shows a pair of plates that are vertically separated to form a flat capillary tube that spreads a thin film of water. This water, heated through solar energy forms a recirculating hot water system for household use.

F. E. Danner U.S. Pat. No. 1,473,018 granted Nov. 6, 1923 for "Solar Heater" discloses heating coils arranged on a plate. The plate serves as a heat intercepting barrier that absorbs solar heat to provide a source of warm water.

I. J. Winterfeldt U.S. Pat. No. 3,207,211, granted Sept. 21, 1965 for "Eaves Trough With Radiation Absorbing Attachment", shows a solar radiation absorbing tab that is attached to a conventional rain gutter. The tab absorbs solar heat in order to melt the ice and snow that otherwise would collect in the trough and prevent water run-off.

U.S. Pat. No. 3,893,508 granted July 8, 1975 to Josef Nemet for "Pressure Vessel" discloses a temperature stabilizing construction for a reactor pressure vessel.

James F. Wiegand et. al. U.S. Pat. No. 4,003,365 granted Jan. 18, 1977 for "Structure for Collecting Solar Energy" describes a transparent membrane overlaying a solar heat absorption surface. The underside of the absorption surface is exposed to a water spray, which spray absorbs heat from the absorption surface. The heated water then drops from the surface and flows to a reservoir for subsequent use.

U.S. Pat. No. 4,029,080 granted June 14, 1977, to Robert W. Warren for "Thermal Collector Solar Energy Adapted for High Temperature Operation" discloses a translucent roof structure that transmits solar radiation to a heat conductive backing. The backing is supported above a layer of insulating material in order to form an air passage between the backing and the layer of insulation. Air currents flowing through this air passage transfer heat to a fluid filled tube. The fluid so heated then is used for heating or cooling purposes.

U.S. Pat. No. 4,051,832 granted Oct. 4, 1977 to William Stelzer for "Solar Heating Panels" describes a sheet metal panel which is placed against a glass pane. The sheet metal panel absorbs heat from solar radiation through the glass pane. The heat thus absorbed is extracted from the metal panel by conventional means for subsequent utilization.

U.S. Pat. No. 4,055,162, granted to Ed Gonzalez on Oct. 25, 1977 for "Solar Energy Collector", discloses a serpentine coil through which a heat absorbing fluid flows. The coil is mounted within a shell that is filled generally with insulating material.

Harold K. Meier, et. al., U.S. Pat. No. 4,056,092 for "Flat Plate Solar Energy Collector" granted on Nov. 1, 1977 is directed to a surface that absorbs solar radiation, the heat of which is transferred to a thin sheet of water which flows in contact with a solar heated body and a superposed sheet of transparent material.

Most of these patents reflect efforts to provide a satisfactory means for converting solar radiation into useful energy. For one reason or another, each of these efforts produced a less than satisfactory result. Consequently, there remains a need for an inexpensively marketed and easy to install solar radiation collector that can be applied to residential, commercial or farming construction. To be fully acceptable, the solar radiation collector must provide a great deal of flexibility in regulating the temperature within the building in which the system is installed.

These difficulties that have characterized the prior art are overcome, to a large extent, through the practice of the invention. Illustratively, interlocking copper plates are secured to the exterior surface of a roof or other outer building surface. These interlocking copper plates have thermally conductive fins which are in conductive thermal contact with, and structurally support a serpentine array of fluid filled tubes. These tubes are disposed in a duct space that is formed between, for example, the building rafters and a layer of insulating material that is positioned beneath the interlocked plates.

Vents close to the ground level of the building, as well as grills within the building, provide a simple means for adjusting the building interior temperature. Further in this regard, a unique plate that characterizes a salient feature of the invention, provides a very efficient arrangement for connecting the serpentine array of tubes in thermal contact with the solar heat collection portion of the plates and for interlocking adjacent courses of the plate on the building surface.

For a more detailed understanding of the principles and advantages of the invention, attention is invited to the accompanying drawings and description of preferred embodiments of this invention. The scope of the invention, however, is limited only by the claims.

Figure 1:
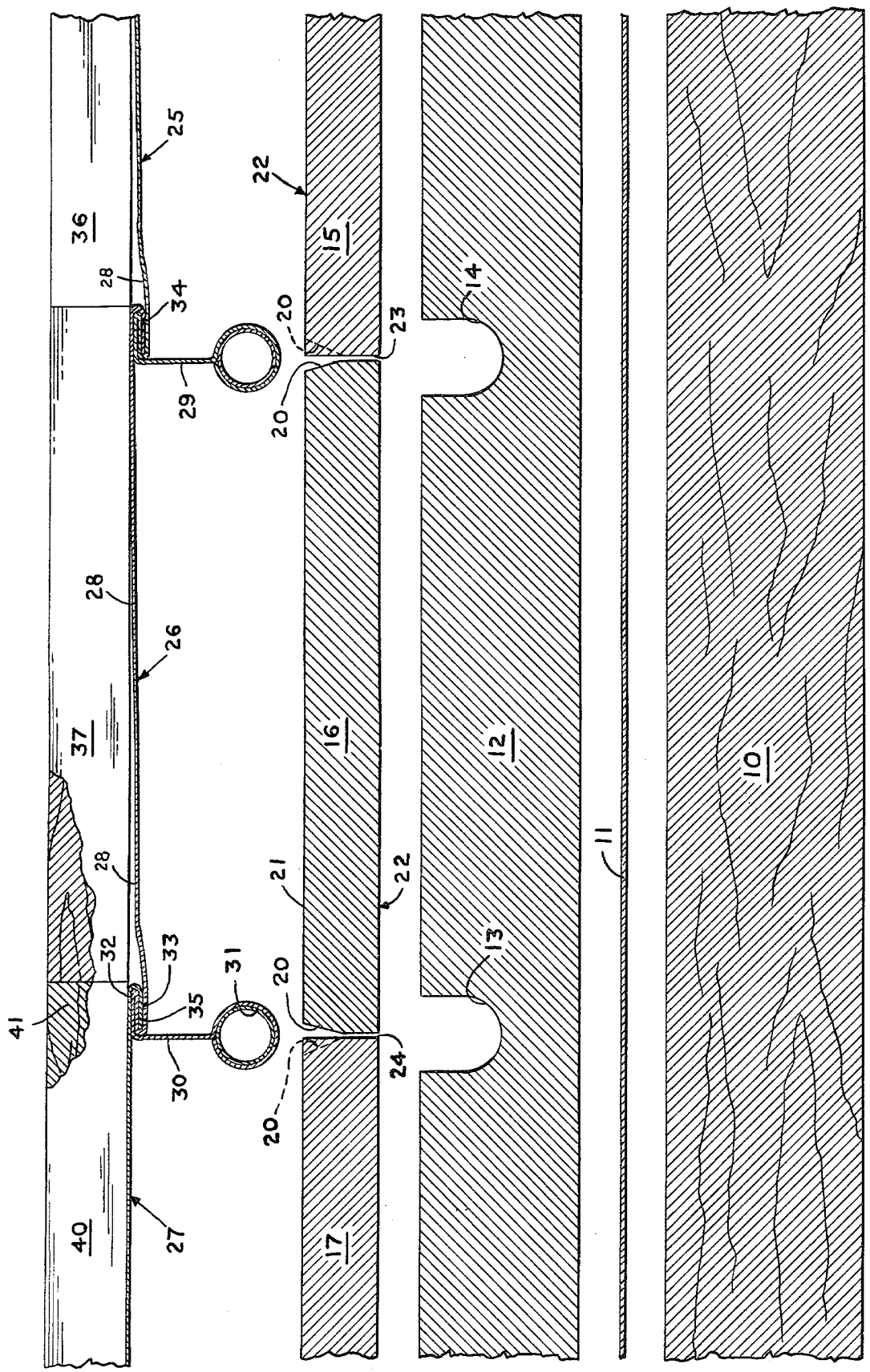
FIG. 1 is a front elevation in full section of an exploded view of a typical installation embodying principles of the invention.

For a more complete appreciation of the invention, attention is invited to FIG. 1 which shows a typical roof rafter 10. A thin, flat sheet 11 of aluminum that is 4' long by 8' wide is secured to the top surface of the rafters 10 (only one rafter 10 is shown in FIG. 1) in order to form a continuous web of duct gauge aluminum that extends over the entire rafter structure. Individual sheets of aluminum, moreover, that form this web have seams that overlap by about 1" and which are sealed with duct tape. Further in this regard, these sheets are joined on the longitudinal centerlines of the respective rafters 10.

Longitudinal beams 12 that have generally rectangular cross sections are placed over the respective adjacent rafters 10 and portions of the aluminum sheet 11. As shown in FIG. 1 of the drawing, the beam 12 in this illustrative embodiment of the invention is of wood and has transversely disposed notches 13, 14 spaced from each others' respective centers by a distance of $8\frac{1}{2}$". The notches 13, 14, are about 1" wide and 1" deep and the lowermost notch portions are rounded. Although not illustrated in the projection of the drawing that is shown in FIG. 1, the beam 12 is one of a parallel, spaced array of these beams which are superimposed on the aluminum sheet 11 in alignment with respective rafters 10, to which the beams 12 are nailed.

An array of boards 15, 16, 17 also are superimposed on the beam 12. Typically, the boards 15, 16, 17 are about 1" thick and are square in shape, with about $8\frac{1}{2}$" on each side. Each of the boards 15, 16, 17 are provided with bevels 20 along those edges of the surface of the boards that are opposite to the surface which is in engagement with the beam 12. These bevels preferably are $\frac{3}{8}$" wide and $\frac{1}{2}$" deep. The boards 15, 16, 17, moreover, in this embodiment of the invention, are of wood, although other materials are suitable. Particularly in this respect, rigid foamglass or any other material with relatively low thermal conductivity and adequate structural strength and rigidity are acceptable for the purposes of the invention.

Heat reflecting surfaces 21, 22 of the aluminum foil, or the like, are glued or otherwise secured to the surfaces of the boards 15, 16, 17 that are parallel to the web of aluminum sheets 11. Note in FIG. 1 that the boards 15, 16, 17 are spaced transversely from each other by small gaps 23, 24. It should be noted further in FIG. 1 that the transverse gaps 23, 24 are each respectively in vertical alignment with the centers of the notches 14, 13 respectively.

The combined bevels 20 of adjacent boards 15, 16 or 16, 17 form a "V" shaped troughs that provide "flex" notches to accommodate thermal expansion and contraction in a direction that is generally perpendicular to the sheet 11, in a manner described subsequently in more complete detail.

An array of interlocked solar energy collector plates 25, 25, 27 overlay the assembled rafters 10, sheet 11, beam 12 and boards 15, 16 and 17. Each of the plates 25, 26, 27 is formed from 0.021 gauge roofing copper, weighing 16 ounces to the square foot of surface area. Each of these plates moreover has a generally transverse web 29, 30 that is drawn tightly around a $\frac{3}{4}$" outside diameter copper tube 31. The webs 29, 30 not only are perpendicular to the orientation of the plates 25, 26, but also are in alignment with the respective gaps 23, 24 between the boards 15, 16 and 16, 17. As perhaps best seen in connection with the plate 26, a folded over portion 32 of the plate is generally parallel with and spaced slightly above the plane of solar energy collecting surface 28 of the plate 26 in order to form a gap 33 between the folded over portion 32 and the collecting surface 28.

The end of the plate 26 that is opposite to the web 30 and the fold 32 terminates in a reentrant fold 34 that is oriented toward and on the same side of the collecting surface as the web 30. The plate 27 also has a reentrant fold 35 which is received in the gap 33 that is formed between the folded portion 32 and the adjacent solar energy collecting surface 28. In this manner, adjacent solar energy collector plates 26, 27 are locked together.

The reentrant folds 34, 35, moreover, are "tinned" with solder, or the like. Thus, by applying a hot soldering iron to mated sets of the reentrant fold and folded over portions a sound and long-lasting wind-and watertight seal is formed between each adjacent course of plates.

Each of the plates 25, 26, 27 have further portions 36, 37, 40 that are generally perpendicular to the planes of the respective solar energy collecting surfaces of the plates. These portions 36, 37, 40 also are parallel to the rafters 10 and the beams 12 and perpendicular to the direction of the webs 29, 30 and the folds 32, 34, 35. The portions 36, 37, 40 are pressed against a batten 41 of wood, or the like which is oriented in a direction that is generally parallel with the rafters 10 and the beam 12.

Figure 2:
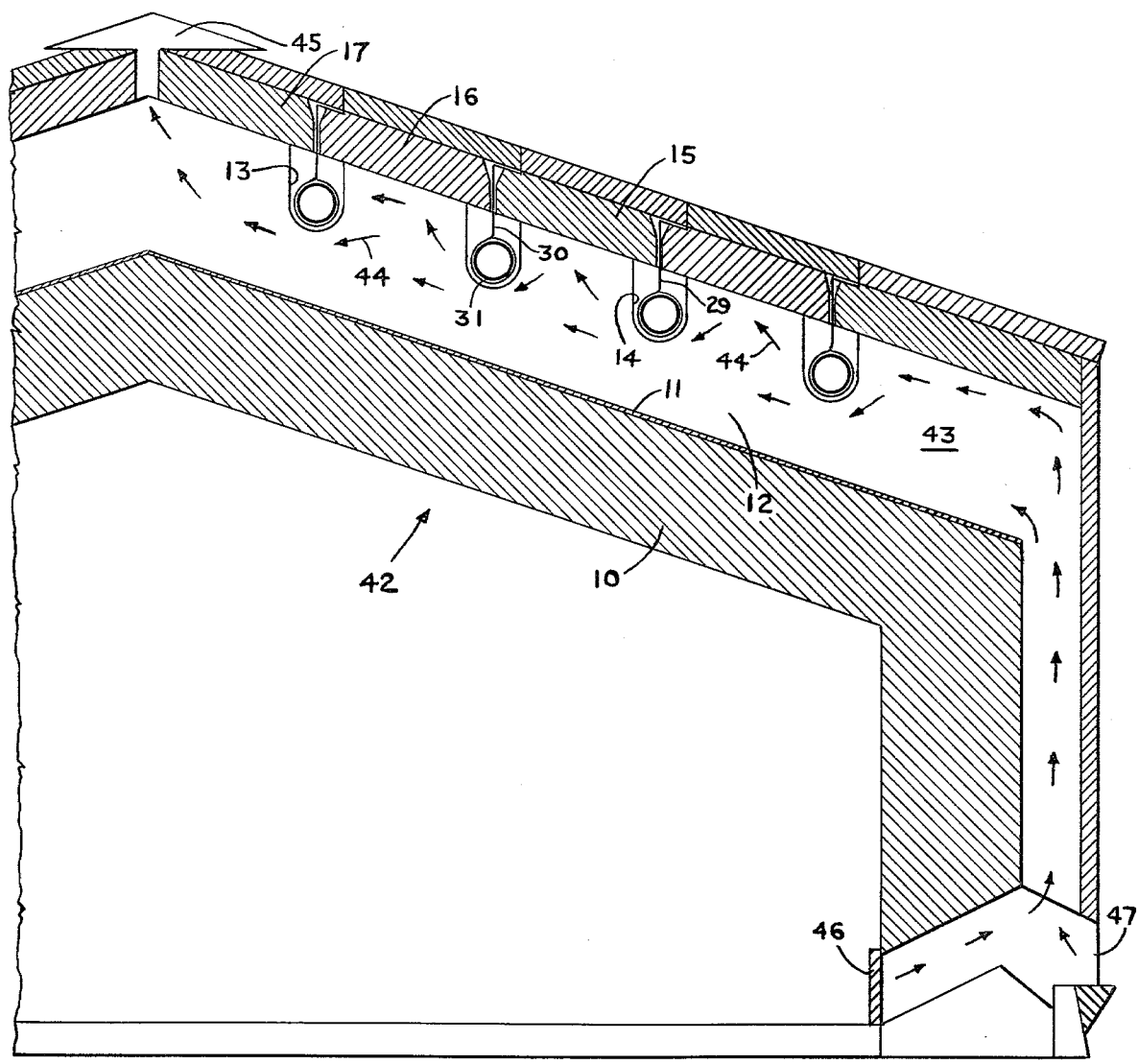
FIG. 2 is a schematic profile view in full section of building to show an installation embodying features of the invention.

Turning now to FIG. 2, a combination duct and solar energy collection system is shown fully assembled and mounted on the peaked roof 42 of a conventional building. Thus, as shown, the sheet 11 is clamped between the rafters 10 and the notched beam 12. The courses of copper tubing 31, moreover, are lodged in the notches 13, 14 in order to extend across a duct 43 that is formed by means of the spaced beams 12 (only one of which is shown in FIG. 2), the sheet 11 and the boards 15, 16, 17. Note also should be taken of the fact that the webs 29, 30 and the associated tubing 31 form a baffle for air flowing through the duct 43 as indicated by arrows 44. The aerodynamic turbulance created by this baffle effect enhances heat transfer from the solar energy collected in the form of heat absorbed in the circulating fluid within the tubing 31 to the atmospheric environment in the duct 43.

Note also that the peak of the roof 42 is provided with a vent 45 as a part of the system's air circulation. As shown in FIG. 2, a predetermined volume of air may enter the duct 43 through either an interior grill 46 near the base-board of the building, or an exterior vent 47 that is near the junction between the wall of the building and the ground.

Figure 3:
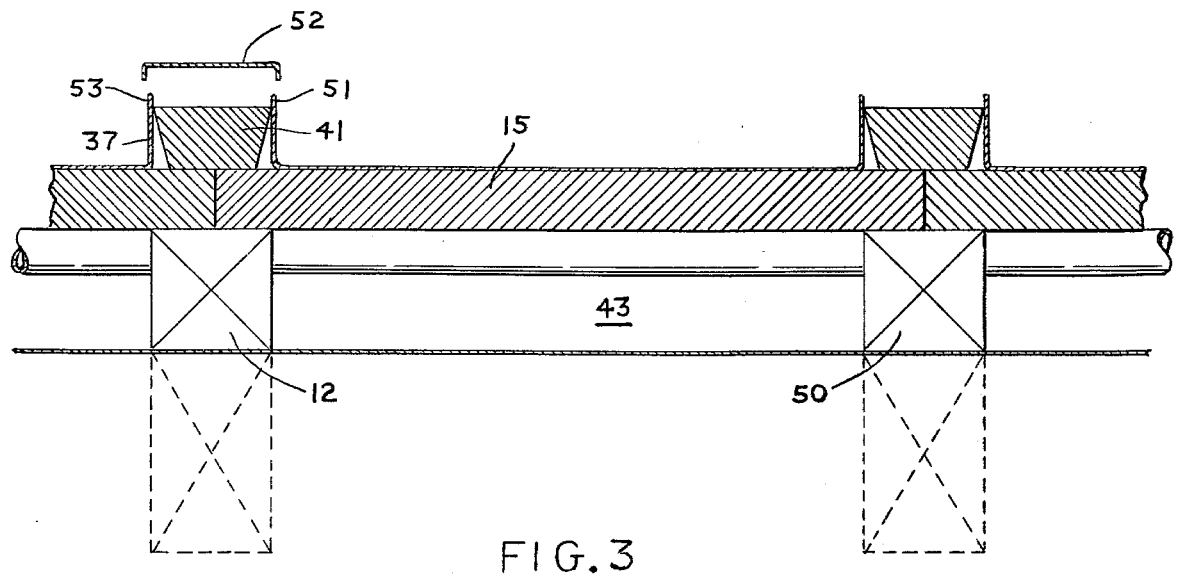
FIG. 3 is a full section view of a typical duct and batten arrangement for use in the embodiment of the invention that is shown in FIG. 1 and 2.

In FIG. 3, the duct 43 that is formed between adjacent beam 12 and a beam 50, the sheet 11 and the board 15, is perhaps shown more clearly. In this view, the batten 41 also is shown with a characteristic trapezoid cross section, the short parallel base of the trapezoid being placed against the board 15. Note also that the portion 37 of the solar energy collecting plate 26 bears against the edge formed between the diverging side and the long parallel side of the batten 41.

To insure that an adequate seal is provided to prevent rain or snow leakage into the interior of the building or to stop undesirable air infiltration into the system, a $\frac{1}{4}$" strip 51 protrudes above the exposed long parallel surface of the batten 41. A cap flashing 52 that fits over the long parallel surface of the batten 41 is pressed over the strip 51, as well as a corresponding strip 53, and bears against the top of the batten. This combination produces a tight, sturdy and easily installed seal for the purpose of the invention.

Figure 4:
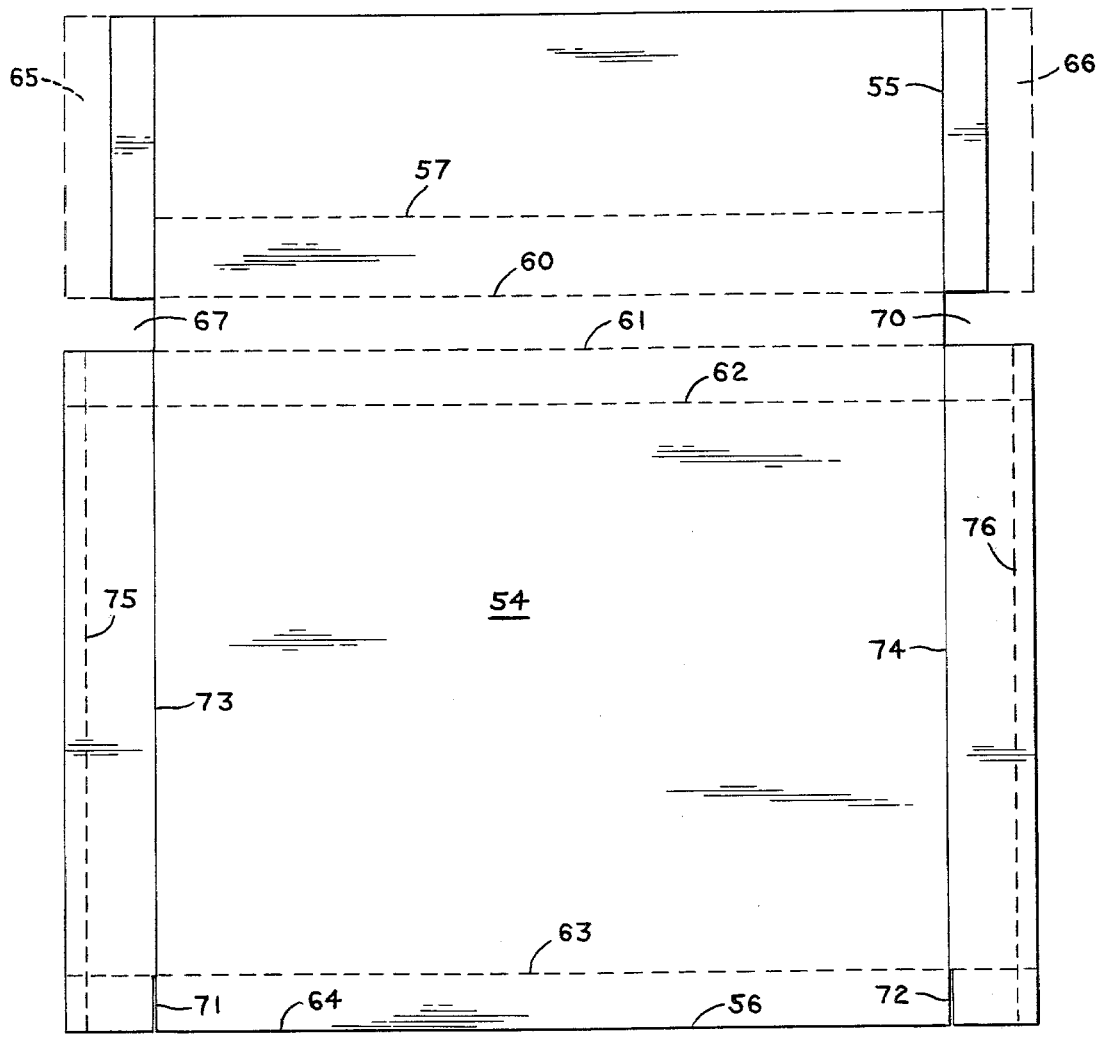
FIG. 4 is a plan view of a layout from which a solar energy collector plate of a type which characterizes principles of the invention is assembled.

Further in accordance with another feature of the invention, the solar energy collector plates 25, 26 and 27 which are shown in FIG. 1 are formed from a specially prepared sheet of copper, or other material of suitably high thermal conductivity as shown in FIG. 4. Illustratively, the solar energy collector plate 54 in this specific embodiment as a lengthwise dimension 55 of about 15¼" and a width 56 of about 48". The length of the plate 54 is divided into six zones, a zone 57 which is about 2¾ inches long, a zone 60 which is about 1 inch long, a zone 61 which is about ¾ inch long, a zone 62 which also is about ¾ of an inch long, a zone 63 which is about 9¼ inch long and a zone 64 which is ¾ of an inch long.

Preferably, the plate 54 has the zones 57 and 60 through 64 identified by means of scoring, scribe marks, or the like. Two segments 65, 66, each ⅝ of an inch wide, are clipped from the edge of the plate 54 through the full lengths of zones 57 and 60. Adjacent to the zone 61 moreover, rectangular segments 67 and 70 are clipped from the width of the plate 54, each to a respective depth of 1¼ inches. Slits 71 and 72 are formed in the zone 64 each to a depth of ¾ of an inch. The slits 71, 72 moreover, are spaced inwardly from the respective edges of the plate 54 by a distance of 1¼ inch. Thus, each of the respective slits 71, 72 is in alignment with the edge of the plate that was formed by removing the segments 67, 70 which were adjacent to the zone 61.

Further in this respect, scribe marks 73, 74 are formed through the zone 63 in a lengthwise direction in alignment with the respective slits 71 and 72.

Thus when suitably folded, the zone 57 is pressed tightly around the heat conducting tube (not shown FIG. 4) and the zone 60 forms the web that connects the tube to the heat collecting portion of the collector plate in a thermally conductive manner. The zones 61 and 62 form the folded over portion of the solar energy collector plate 54 that is spaced from the zone 63, which in fact forms the solar energy collecting surface.

The zone 64, when folded toward the zone 57, forms the folded over portion of the solar energy collector plate that is engaged in the space formed between the reentrant folds and the solar energy collecting surface on the next adjacent plate in the array on the roof of the building. An additional pair of scribe lines 75, 76 (which are spaced inwardly from the width-wise edges of the plate 54 each by about ¼ inch) form the strips which are bent under the cap flashing (not shown in FIG. 4) to provide a suitable weather and air proof seal for the battens (also are not shown in this figure of the drawing).

One side of the plate 54 is provided with a pretinned band that covers the zones 61 and 62. In this way, during assembly of the solar collecting system, a folded over portion engaged with the reetrant folds that are provided by the zones 61 and 62 are formed into a sturdy, water-tight seal by running a hot soldering iron, or the like, over the pre-tinned reentrant folds to cause the tinning to melt and later to fuse into a soundly soldered joint.

Although not shown or illustrated in the drawing, the tubing for collecting the heat from the absorbed solar radiation is transferred to a working fluid. Illustratively water, antifreeze, or some other suitable liquid can be used as a working fluid. The tubing through which the working fluid flows, moreover, need not be circular in cross-section. Thus, special tubing, formed in the shape of an open trough that is covered or closed by means of a flat plate which is generally parallel with the solar collecting surface of the plate structure also can be used to advantage in connection with the practice of the invention.

Figure 5:
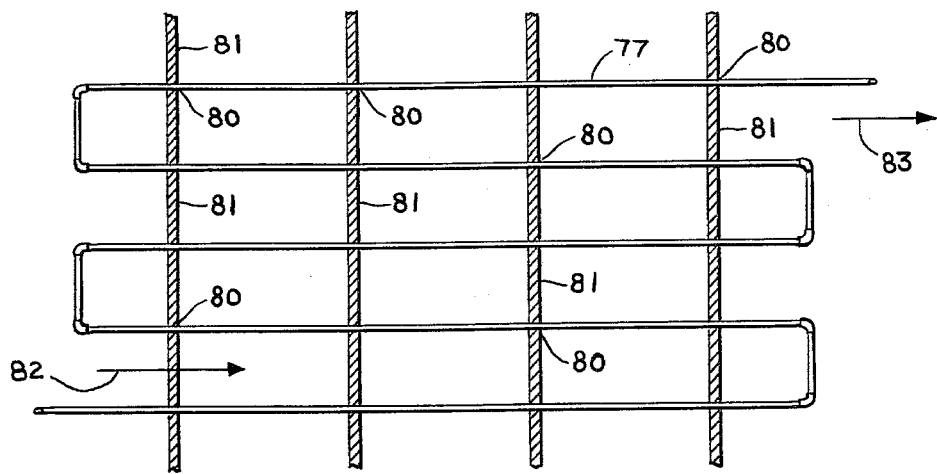
FIG. 5 is a typical piping diagram for use in connection with the invention.

FIG. 5 shows a typical serpentine arrangement of tubes 77 which are mounted in notches 80 that are formed in rafters 81 of a roof structure. Thus, fluid entering the tubes 77 in the direction of arrow 82 gradually absorbs heat transferred from the solar collecting portions of the plate through the interconnecting webs (not shown in FIG. 5) that support the tubes 77. The working fluid within the tube 77 moreover, flowing in the tube either through forced circulation or through nautral thermal convection discharges from the tube in the direction of arrow 83.

In one mode of operation, air outside of the building in a predeterminded volume enters exterior vent 47 and may mix in suitable proportions with air recirculating in the inside of the building that enters the grill 46 also in a predetermined volume. This air mixture which flows through the ducting 43 that is formed between the building rafters and the boards 15, 16, and 17 may absorb thermal energy from the copper tube 31. Thus, through a suitable manipulation of the relative mixture of air entering the system through the exterior vent 47 and the interior grill 46, the desired thermal conditions are established within the building. Alternatively, the vent 47 and the grill 46 as well as the duct structure need not be used. Thus, the hot working fluid in the tubing can be applied directly to a hot water heating system or the household hot water supply system.

Thus, there is provided in accordance with the practice of the invention a system of extensive building ducts that heat the structure through solar energy collector plates in a way that reduces high labor costs in a manner that is versatile, and adaptable to a wide variety of buidling and environmental conditions.

I claim:

1. A solar energy system for a building comprising, a plurality of interlocked flat solar energy collecting plate portions forming a portion of the building surface, each of said plates having a generally flat solar energy collecting surface, a folded over portion of the plate at one end of said collecting surface, said foled over portion being spaced from and parallel with one side of said flat solar energy collecting surface, a pair of overlapping reentrant folds formed in the plate, said reentrant folds being parallel with and spaced from another side of said flat solar energy collecting surface and at the end thereof that is opposite to said folded over portion, a web integral with said reentrant folds and generally perpendicular thereto to protrude past said flat solar energy collecting surface and said folded over portion, a further portion integral with said web for transferring collected solar heat from the solar energy collecting surface, tubes for removing solar energy from said collecting surfaces being in thermal contact therewith through said webs, a plurality of beams having notches formed therein in order to receive and support said tubes, and generally air-tight sheeting attached to said beams on sides thereof that are opposite to said notched sides in order to form a duct between said plate portions, said beams and said sheeting.

2. A system according to claim 1 further comprising a plurality of boards, each of said boards being interposed between adjacent pairs of webs, said boards each being also interposed between said plates and said beams.

* * * * *